United States Patent
Chuang et al.

(10) Patent No.: US 11,089,323 B2
(45) Date of Patent: Aug. 10, 2021

(54) METHOD AND APPARATUS OF CURRENT PICTURE REFERENCING FOR VIDEO CODING

(71) Applicant: MEDIATEK INC., Hsinchu (TW)

(72) Inventors: Tzu-Der Chuang, Zhubei (TW); Ching-Yeh Chen, Taipei (TW); Yu-Chen Sun, Keelung (TW); Yu-Wen Huang, Taipei (TW); Shan Liu, San Jose, CA (US); Xiaozhong Xu, State College, PA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/301,772

(22) PCT Filed: May 26, 2017

(86) PCT No.: PCT/CN2017/086049
§ 371 (c)(1),
(2) Date: Nov. 15, 2018

(87) PCT Pub. No.: WO2017/206803
PCT Pub. Date: Dec. 7, 2017

(65) Prior Publication Data
US 2019/0222859 A1    Jul. 18, 2019

Related U.S. Application Data

(60) Provisional application No. 62/342,883, filed on May 28, 2016.

(51) Int. Cl.
*H04N 19/52* (2014.01)
*H04N 19/105* (2014.01)
(Continued)

(52) U.S. Cl.
CPC ............ *H04N 19/52* (2014.11); *H04N 19/00* (2013.01); *H04N 19/105* (2014.11);
(Continued)

(58) Field of Classification Search
USPC ...................................... 375/240.16
See application file for complete search history.

(56) References Cited

U.S. PATENT DOCUMENTS

2014/0376634 A1 * 12/2014 Guo ................... H04N 19/513
375/240.16
2015/0049813 A1    2/2015 Tabatabai et al.
(Continued)

FOREIGN PATENT DOCUMENTS

CN          103634603 A        3/2014
CN          105493507 A        4/2016
(Continued)

OTHER PUBLICATIONS

International Search Report dated Aug. 9, 2017, issued in application No. PCT/CN2017/086049.
(Continued)

*Primary Examiner* — Christopher S Kelley
*Assistant Examiner* — Ana Picon-Feliciano
(74) *Attorney, Agent, or Firm* — Oblon, McClelland, Maier & Neustadt, L.L.P.

(57) ABSTRACT

A method and apparatus for a video coding system with the current picture referencing (CPR) mode enabled are disclosed. According to one method, the luma and chroma blocks of the current image are jointly coded using a same coding unit (CU) structure if the CPR mode is selected for the luma and the chroma blocks. Alternatively, if the luma and chroma components are partitioned into the luma and the chroma blocks separately using separate CU structures, the luma and chroma blocks are encoded or decoded using
(Continued)

a coding mode selected from a coding mode group excluding the CPR mode. According to another method, the luma and chroma blocks of the current image are coded separately using a different CU structure if the CPR mode is selected for the luma and chroma blocks. In yet another method, reconstructed reference data is disclosed for the CPR mode with CU equal to PU.

20 Claims, 7 Drawing Sheets

(51) Int. Cl.
| | |
|---|---|
| *H04N 19/176* | (2014.01) |
| *H04N 19/119* | (2014.01) |
| *H04N 19/186* | (2014.01) |
| *H04N 19/513* | (2014.01) |
| *H04N 19/70* | (2014.01) |
| *H04N 19/00* | (2014.01) |
| *H04N 19/159* | (2014.01) |
| *H04N 19/96* | (2014.01) |
| *H04N 19/436* | (2014.01) |

(52) U.S. Cl.
CPC ......... *H04N 19/119* (2014.11); *H04N 19/159* (2014.11); *H04N 19/176* (2014.11); *H04N 19/186* (2014.11); *H04N 19/513* (2014.11); *H04N 19/70* (2014.11); *H04N 19/96* (2014.11); *H04N 19/436* (2014.11)

(56) References Cited

U.S. PATENT DOCUMENTS

| | | | |
|---|---|---|---|
| 2015/0195559 A1* | 7/2015 | Chen | H04N 19/11 |
| | | | 375/240.16 |
| 2015/0304662 A1 | 10/2015 | Liu et al. | |
| 2015/0373332 A1 | 12/2015 | Kim et al. | |
| 2016/0057419 A1 | 2/2016 | Francois et al. | |
| 2016/0227244 A1* | 8/2016 | Rosewarne | H04N 19/105 |
| 2016/0241868 A1* | 8/2016 | Li | H04N 19/56 |
| 2016/0277761 A1* | 9/2016 | Li | H04N 19/132 |
| 2017/0208336 A1* | 7/2017 | Li | H04N 19/119 |

FOREIGN PATENT DOCUMENTS

| | | |
|---|---|---|
| CN | 105594211 A | 5/2016 |
| TW | 201320764 A | 5/2013 |
| WO | 2013/064100 A1 | 5/2013 |
| WO | WO 2016/055001 A1 | 4/2016 |

OTHER PUBLICATIONS

Combined Chinese Office Action and Search Report dated Jul. 2, 2020 in Chinese Patent Application No. 201780026466.0 (with English translation of Category of Cited Documents), 11 pages.

* cited by examiner

M/2xM
Symmetric vertical splitting

M/2xM
Symmetric horizontal splitting

M/4xM (L)    M/4xM (R)    MxM/4 (U)    MxM/4 (D)

METHOD AND APPARATUS OF CURRENT PICTURE REFERENCING FOR VIDEO CODING

CROSS REFERENCE TO RELATED APPLICATIONS

The present invention claims priority to U.S. Provisional Patent Application, Ser. No. 62/342,883 filed on May 28, 2016. The U.S. Provisional Patent Application is hereby incorporated by reference in its entirety.

FIELD OF INVENTION

The present invention relates to block partition for coding and/or prediction process in video coding. In particular, the present invention discloses various coding arrangements for a coding system using current picture referencing (CPR).

BACKGROUND OF THE INVENTION

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8. Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a block is firstly partitioned by a quadtree structure and the quadtree splitting can be iterated until the size for a splitting block reaches the minimum allowed quadtree leaf node size. If the leaf quadtree block is not larger than the maximum allowed binary tree root node size, it can be further partitioned by a binary tree structure and the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure is usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

For block-based coding, there is always a need to partition an image into blocks (e.g. CUs, PUs and TUs) for the coding purpose. As known in the field, the image may be divided into smaller images areas, such as slices, tiles, CTU rows or CTUs before applying the block partition. The process to partition an image into blocks for the coding purpose is referred as partitioning the image using a coding unit (CU) structure. The particular partition method to generate CUs, PUs and TUs as adopted by HEVC is an example of the coding unit (CU) structure. The QTBT tree structure is another example of the coding unit (CU) structure.

Current Picture Referencing

Motion estimation/compensation is a well-known key technology in hybrid video coding, which explores the pixel correlation between adjacent pictures. In a video sequence, the object movement between neighbouring frames is small and the object movement can be modelled by two-dimensional translational motion. Accordingly, the patterns corresponding to objects or background in a frame are displaced to form corresponding objects in the subsequent frame or correlated with other patterns within the current frame. With the estimation of a displacement (e.g. using block matching techniques), the pattern can be mostly reproduced without the need to re-code the pattern. Similarly, block matching and copy has also been tried to allow selecting the reference block from within the same picture. It was observed to be not efficient when applying this concept to videos captured by a camera. Part of the reasons is that the textual pattern in a spatial neighbouring area may be similar to the current coding block, but usually with some gradual changes over space. It is thus difficult for a block to find an exact match within the same picture of video captured by a camera. Therefore, the improvement in coding performance is limited.

However, the spatial correlation among pixels within the same picture is different for screen content. For typical video with text and graphics, there are usually repetitive patterns within the same picture. Hence, Intra (picture) block compensation has been observed to be very effective. A new prediction mode, i.e., the Intra block copy (IBC) mode or called current picture referencing (CPR), has been introduced for screen content coding to utilize this characteristic. In the CPR mode, a prediction unit (PU) is predicted from a previously reconstructed block within the same picture. Further, a displacement vector (called block vector or BV) is used to signal the relative displacement from the position of the current block to the position of the reference block. The prediction errors are then coded using transformation, quantization and entropy coding. An example of CPR compensation is illustrated in FIG. 6, where area 610 corresponds to a picture, a slice or a picture area to be coded. Blocks 620 and 630 correspond to two blocks to be coded. In this example, each block can find a corresponding block in the previous coded area in the current picture (i.e., 622 and 632 respectively). According to this technique, the reference samples correspond to the reconstructed samples of the current decoded picture prior to in-loop filter operations including both deblocking and sample adaptive offset (SAO) filters in HEVC.

An early version of CPR was disclosed in JCTVC-M0350 (Madhukar Budagavi, et al, "AHG8: Video coding using Intra motion compensation", Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350), which is submitted as a candidate technology for HEVC Range Extensions (RExt) development.

In JCTVC-M0350, the CPR compensation was limited to be within a small local area and the search is limited to a 1-D block vector for the block size of 2N×2N only. Later, a more advanced CPR method was developed during the standardization of HEVC SCC (screen content coding).

In order to signal the block vector (BV) efficiently, the BV is signalled predictively using a BV predictor (BVP) in a similar fashion as the MV coding. Accordingly, the BV difference (BVD) is signalled and the BV can be reconstructed according to BV=BVP+BVD as shown in FIG. 7, where reference block 720 is selected as IntraBC prediction for the current block 710 (i.e., a CU). A BVP is determined for the current CU. Methods to derive the motion vector predictor (MVP) is known in the field. Similar derivation can be applied to BVP derivation.

When CPR is used, only part of the current picture can be used as the reference picture. Some bitstream conformance constraints are imposed to regulate the valid MV value referring to the current picture.

First, one of the following two equations must be true:

$$BV\_x + \text{offset}X + nPbSw + xPbs - xCbs <= 0, \text{ and} \quad (1)$$

$$BV\_y + \text{offset}Y + nPbSh + yPbs - yCbs <= 0. \quad (2)$$

Second, the following WPP (Wavefront Parallel Processing) condition must be true:

$$(xPbs + BV\_x + \text{offset}X + nPbSw - 1)/\text{CtbSize}Y - xCbs/\text{CtbSize}Y <= yCbs/\text{CtbSize}Y - (yPbs + BV\_y + \text{offset}Y + nPbSh - 1)/\text{CtbSize}Y \quad (3)$$

In equations (1) through (3), (BV_x, BV_y) is the luma block vector (i.e., the motion vector for CPR) for the current PU; nPbSw and nPbSh are the width and height of the current PU; (xPbS, yPbs) is the location of the top-left pixel of the current PU relative to the current picture; (xCbs, yCbs) is the location of the top-left pixel of the current CU relative to the current picture; and CtbSizeY is the size of the CTU. OffsetX and offsetY are two adjusted offsets in two dimensions in consideration of chroma sample interpolation for the CPR mode:

$$\text{offset}X = BVC\_x \& 0x7?2:0, \quad (4)$$

$$\text{offset}Y = BVC\_y \& 0x7?2:0. \quad (5)$$

(BVC x, BVC y) is the chroma block vector, in ⅛-pel resolution in HEVC.

Third, the reference block for CPR must be within the same tile/slice boundary.

Affine Motion Compensation

The affine model can be used to describe 2D block rotations, as well as 2D deformations of squares (rectangles) into parallelogram. This model can be described as follows:

$$x' = a0 + a1*x + a2*y,$$

$$y' = b0 + b1*x + b2*y. \quad (6)$$

In this model, 6 parameters need to be determined. For each pixels (x, y) in the area of interest, the motion vector is determined as the difference between location of the given pixel (A) and the location of its corresponding pixel in the reference block (A'), i.e., $MV = A' - A = (a0 + (a1-1)*x + a2*y, b0 + b1*x + (b2-1)*y)$. Therefore, the motion vector for each pixel is location dependent.

According to this model, if the motion vectors of three different locations are known, then the above parameters can be solved. It is equivalent to the condition that the 6 parameters are known. Each location with a known motion vector is referred as a control point. The 6-parameter affine model corresponds to a 3-control-point model.

In the technical literature by Li, et al. ("An affine motion compensation framework for high efficiency video coding", in 2015 IEEE International Symposium on Circuits and Systems (ISCAS), 24-27 May 2015, Pages: 525-528) and by Huang et al. ("Control-Point Representation and Differential Coding Affine-Motion Compensation", IEEE Transactions on Circuits, System and Video Technology (CSVT), Vol. 23, No. 10, pages 1651-1660, October 2013), some exemplary implementations of affine motion compensation are presented. In the technical literature by Li, et al., an affine flag is signalled for the 2N×2N block partition, when current block is coded in either Merge mode or AMVP mode. If this flag is true, the derivation of motion vectors for the current block follows the affine model. If this flag is false, the derivation of motion vectors for the current block follows the traditional translational model. Three control points (3 MVs) are signalled when affine AMVP mode is used. At each control point location, the MV is predictively coded. Later, the MVDs of these control points are coded and transmitted. In the technical literature by Huang et al., different control point locations and predictive coding of MVs in control points are studied.

A syntax table for an affine motion compensation implementation is shown in Table 1. As shown in Table 1, syntax element use_affine_flag is signalled if at least one Merge candidate is affine coded and the partition mode is 2N×2N (i.e., PartMode==PART 2N×2N) as indicated by Notes (1-1) to (1-3) for the Merge mode. Syntax element use_affine_flag is signalled if the current block size is larger than 8×8 (i.e., (log 2CbSize>3) and the partition mode is 2N×2N (i.e., PartMode==PART 2N×2N) as indicated by Notes (1-4) to (1-6) for the B slice. If use_affine_flag indicates the affine model being used (i.e., use_affine_flag having a value of 1), information of other two control points is signalled for reference list L0 as indicated by Notes (1-7) to (1-9) and information of other two control points is signalled for reference list L1 as indicated by Notes (1-10) to (1-12).

TABLE 1

| | Note |
|---|---|
| prediction_unit(x0, y0,nPbW,nPbH) { | |
|   if( cu_skip_flag[x0][y0] ) { | |
|     if( MaxNumMergeCand > 1 ) | |
|       merge_idx[x0][y0] | |
|   } else { /* MODE_INTER */ | |

TABLE 1-continued

|  | Note |
|---|---|
| merge_flag[x0][y0] | |
| if( merge_flag[x0][y0] ) { | |
|   if( at least one merge candidate is affine coded &&PartMode == PART_2Nx2N) | 1-1 |
|     use_affine_flag | 1-2 |
|   else | 1-3 |
|   if( MaxNumMergeCand > 1 ) | |
|     merge_idx[x0][y0] | |
| } else { | |
|   if( slice_type == B ) | |
|     inter_pred_idc[x0][y0] | |
|   if( log2CbSize > 3 &&PartMode == PART_2Nx2N) | 1-4 |
|     use_affine_flag | 1-5 |
|   if( inter_pred_idc[x0][y0] != PRED_L1 ) { | 1-6 |
|     if( num_ref_idx_l0_active_minus1 > 0 ) | |
|       ref_idx_l0[x0][y0] | |
|     mvd_coding(x0,y0,0) | |
|     if( use_affine_flag){ | 1-7 |
|       mvd_coding(x0,y0,0) /* second control point when affine mode is used */ | 1-8 |
|       mvd_coding(x0,y0,0) /* third control point when affine mode is used */ | 1-9 |
|     } | |
|     mvp_l0_flag[x0][y0] | |
|   } | |
|   if( inter_pred_idc[x0][y0] != PRED_L0 ) { | |
|     if( num_ref_idx_l1_active_minus1 > 0 ) | |
|       ref_idx_l1[x0][y0] | |
|     if( mvd_l1_zero_flag &&inter_pred_idc[x0][y0] == PRED_BI ) { | |
|       MvdL1[x0][y0][0] = 0 | |
|       MvdL1[x0][y0][1] = 0 | |
|     } else | |
|       mvd_coding(x0,y0,1) | |
|       if( use_affine_flag){ | 1-10 |
|         mvd_coding(x0,y0,1) /* second control point when affine mode is used */ | 1-11 |
|         mvd_coding(x0,y0,1) /* third control point when affine mode is used */ | 1-12 |
|       } | |
|     mvp_l1_flag[x0][y0] | |
|   } | |
|   } | |
|   } | |
| } | |

In the present invention, various aspects of CPR coding with the QTBT structure or luma/chroma separate coding are addressed.

SUMMARY OF THE INVENTION

A method and apparatus for video coding using quad-tree plus binary tree structure or luma/chroma separate coding are disclosed. According to one method of the present invention, when current picture referencing (CPR) mode is enabled, the luma component and said one or more chroma components of the current image are jointly partitioned into luma blocks and chroma blocks using a same coding unit (CU) structure and CPR coding is applied to the luma blocks and the chroma blocks jointly if the CPR mode is selected for the luma blocks and the chroma blocks, or when the luma component and said one or more chroma components of the current image are partitioned into the luma blocks and the chroma blocks separately using separate CU structures, the luma blocks and the chroma blocks are encoded or decoded using a coding mode selected from a coding mode group excluding the CPR mode.

According to another method, the luma and chroma components of the current image are partitioned separately into luma blocks and chroma blocks using separate CU structures. The current picture referencing (CPR) coding is applied to the luma blocks or chroma blocks separately if CPR mode is selected for to the luma blocks or chroma blocks respectively. For the luma blocks, the CPR refers to luma reference data in a reconstructed luma image of the current image using first motion vectors (MVs). For the chroma blocks, the CPR refers to chroma reference data in a reconstructed chroma image of the current image using second MVs. In one embodiment, the first MVs and the second MVs are different. In another embodiment, a first MV for a collocated luma block is used to derive the second MV for a corresponding chroma block wherein the first MV is a scaled MV of the collocated luma block if the luma component and said one more chroma components have different resolutions. If the CPR mode is applied to the corresponding chroma block and the collocated luma block is coded in the CPR mode, the first MV or a scaled MV of the first MV for the collocated luma block can be directly used as the second MV of the corresponding chroma block. In this case, a flag can be used to indicate whether the first MV or the scaled MV of the first MV for the collocated luma block is directly used as the second MV of the corresponding chroma block. The flag is signalled or parsed when the corresponding chroma block is coded with merge mode or when the collocated luma block is coded in the CPR mode. If the CPR mode is applied to the corresponding chroma block and the collocated luma block is not coded in the CPR mode, a default MV can be used as the second MV of the corresponding chroma block. In another embodiment, if the CPR mode is applied to the corresponding chroma block and the collocated luma block is coded in the CPR mode, a first MV or a scaled MV of the first MV for the collocated luma block can be used as an MV predictor (MVP) added to a Merge candidate list or an advanced motion vector prediction (AMVP) candidate list for the corresponding chroma block. The first MV or the scaled MV of the first MV for the collocated luma block can be added to a leading candidate location in the Merge candidate list or the AMVP candidate list for the corresponding chroma block. If the CPR mode is applied to the corresponding chroma block and the collocated luma block is not coded in the CPR mode, a default MV can be used as the MVP added to the Merge or AMVP candidate list for the corresponding chroma block. For example, the default MV can be selected from an MV group comprising (−w, 0), (0, −h), (−w, −h), (−2w, 0) and (0, −2h), wherein w is block width and h is block height. In yet another embodiment, a first MV or a scaled MV of the first MV for a collocated luma block associated with a neighbouring chroma block of the corresponding chroma block can be used directly as the second MV of the corresponding chroma block.

Another aspect of the above invention addresses the constrained reconstructed data for the CPR mode. When the CPR mode is applied to the current image, reference data for a current block of the current image is constrained to reconstructed data available prior to predicting a current CU containing the current block. Accordingly, a block vector (BV) of the current block is constrained to cause one of two equations to be true: BV_x+offsetX+nPbSw<=0 and BV_y+offsetY+nPbSh<=0, where (BV_x, BV_y) corresponds to the BV of the luma component of the current block, (offsetX, offsetY) are two adjusted offsets in consideration of chroma sample interpolation for the CPR mode, and nPbSw and nPbSh correspond to width and height of the current block. The current block may correspond to a current luma block or a current chroma block. The reference data for a current block of the image area is further constrained to a ladder shaped prediction area related to wavefront parallel processing (WPP), which further constrains the block vector (BV) of the current block to: (xPbs+BV_x+offsetX+nPbSw−1)/CtbSizeY−xPbs/CtbSizeY<=yPbs/CtbSizeY−(yPbs+BV_y+offsetY+nPbSh−1)/CtbSizeY, where ((xPbs, yPbs) is a location of a top-left pixel of the current block relative to the current image and CtbSizeY correspond to height of the image area. The offsetX and offsetY are 0 if the luma component and chroma components of the image area are separately partitioned into luma blocks and chroma blocks using separate coding unit (CU) structures.

DETAILED DESCRIPTION

Figure 1:
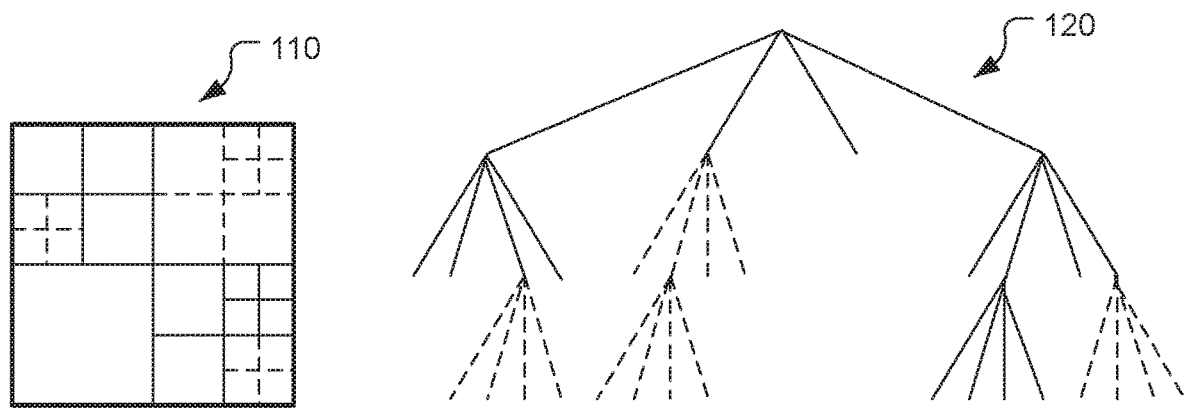
FIG. 1 illustrates an example of block partition using quadtree structure to partition a coding tree unit (CTU) into coding units (CUs).
Figure 2:
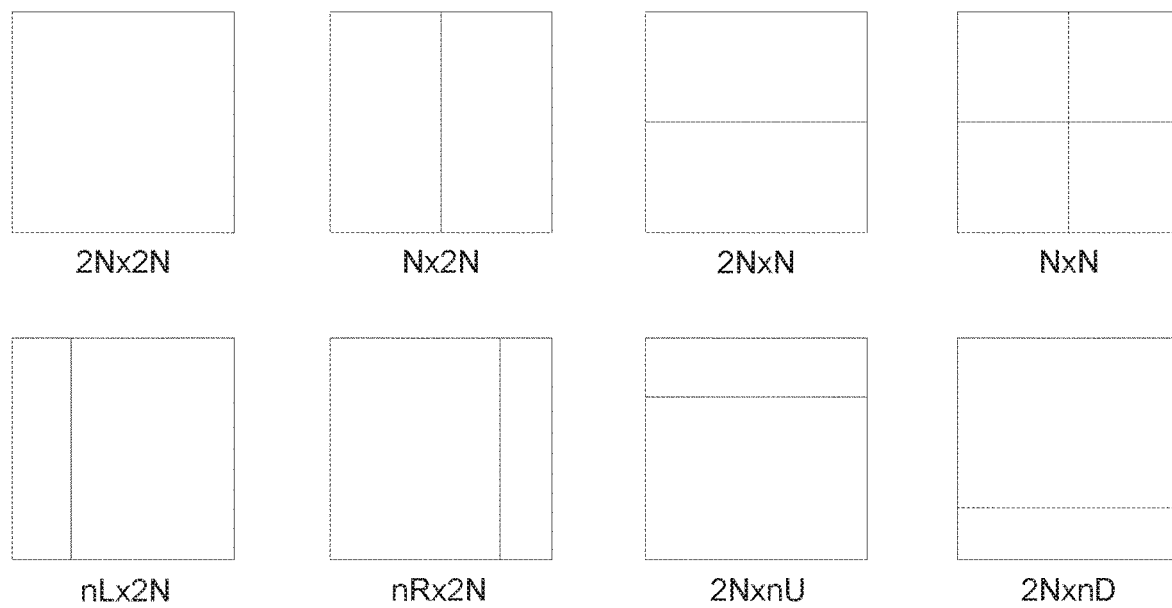
FIG. 2 illustrates asymmetric motion partition (AMP) according to High Efficiency Video Coding (HEVC), where the AMP defines eight shapes for splitting a CU into PU.
Figure 3:
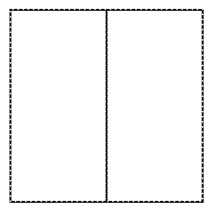
FIG. 3 illustrates an example of various binary splitting types used by a binary tree partitioning structure, where a block can be recursively split into two smaller blocks using the splitting types.
Figure 3:
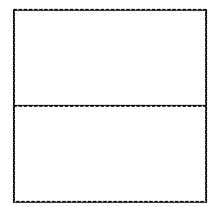
Figure 3:
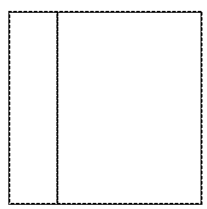
Figure 3:
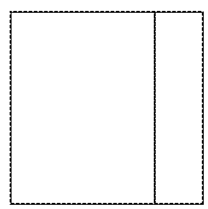
Figure 3:
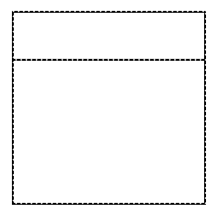
Figure 3:
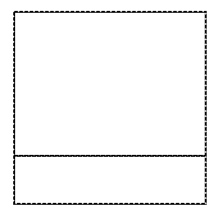
Figure 4:
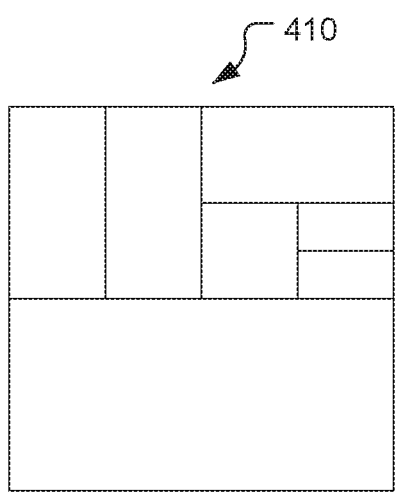
FIG. 4 illustrates an example of block partitioning and its corresponding binary tree, where in each splitting node (i.e., non-leaf node) of the binary tree, one flag is used to indicate which splitting type (horizontal or vertical) is used, where 0 may indicate horizontal splitting and 1 may indicate vertical splitting.
Figure 4:
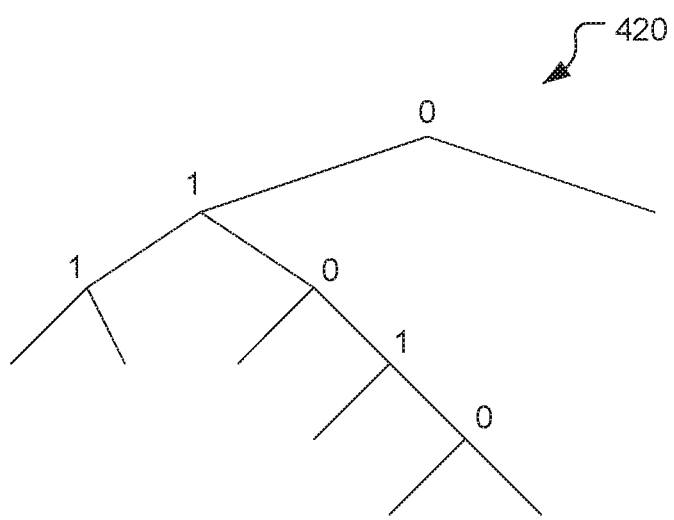
Figure 5:
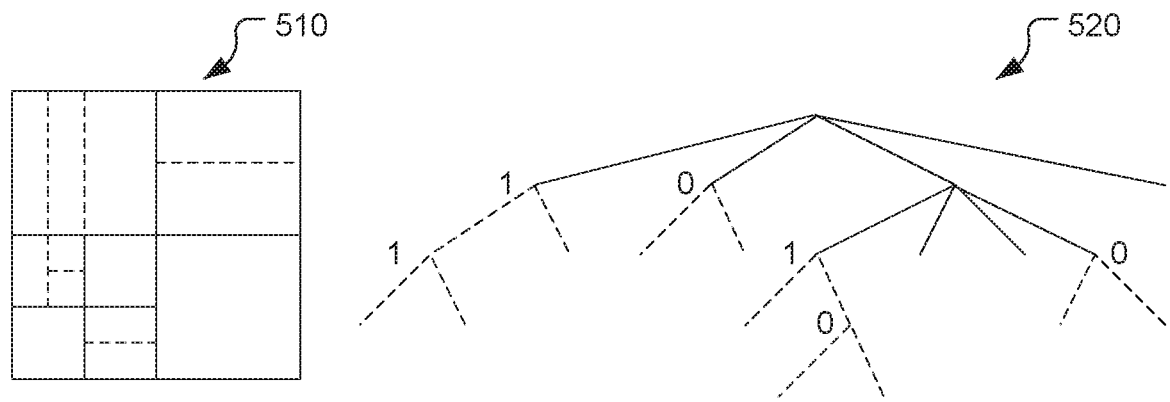
FIG. 5 illustrates an example of block partitioning and its corresponding quad-tree plus binary tree structure (QTBT), where the solid lines indicate quadtree splitting and dotted lines indicate binary tree splitting.
Figure 6:
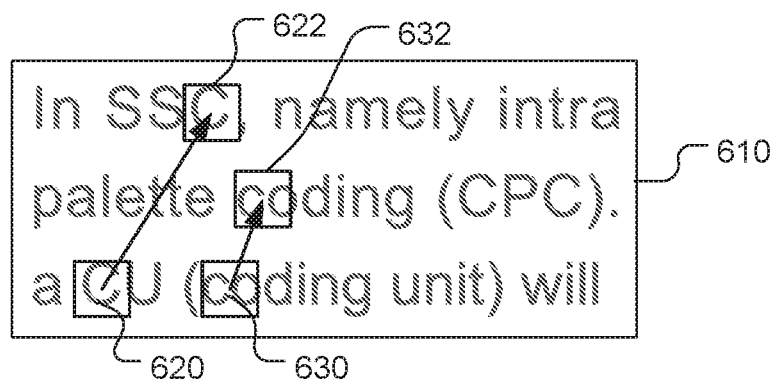
FIG. 6 illustrates an example of CPR compensation, where area 610 corresponds to a picture, a slice or a picture area to be coded. Blocks 620 and 630 correspond to two blocks to be coded.
Figure 7:
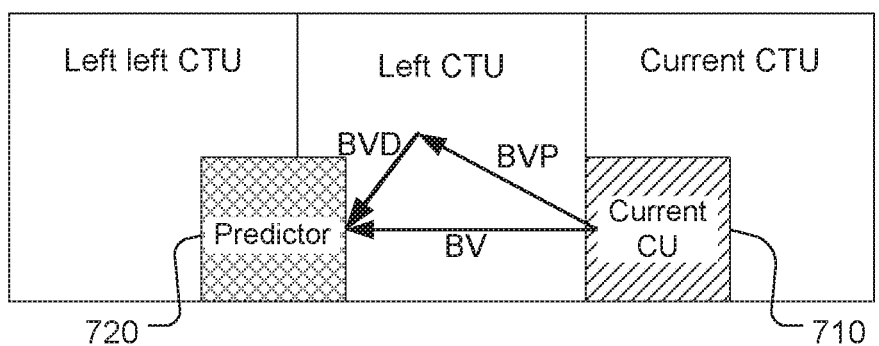
FIG. 7 illustrates an example of predictive block vector (BV) coding, where the BV difference (BVD) corresponding to the difference between a current BV and a BV predictor is signalled.
Figure 8:
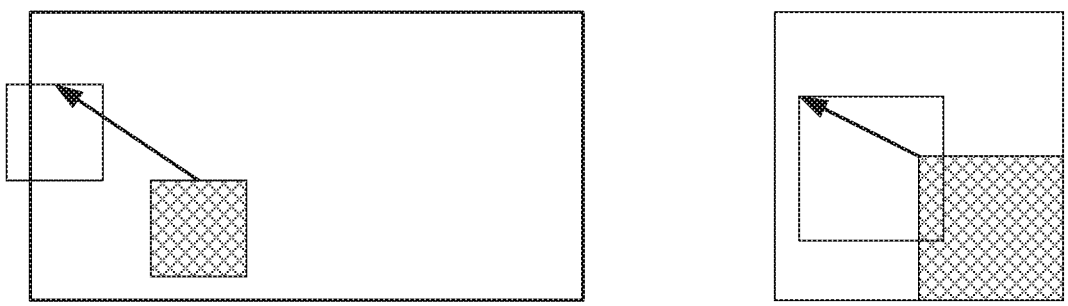
FIG. 8 illustrates examples of constrained reference pixel region for IntraBC mode (i.e., the current picture referencing, CPR mode).
Figure 9:
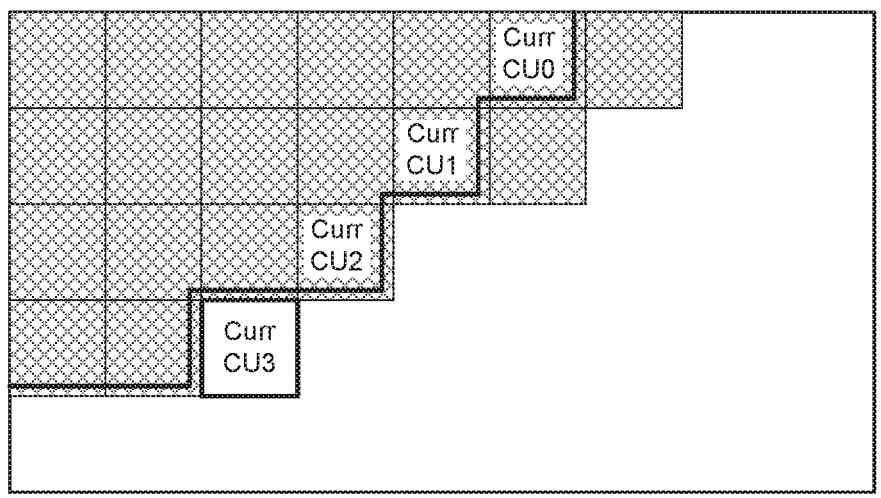
FIG. 9 illustrates an example of ladder-shaped reference data area for WPP (wavefront parallel processing) associated with the CPR mode.

The following description is of the best-contemplated mode of carrying out the invention. This description is made for the purpose of illustrating the general principles of the invention and should not be taken in a limiting sense. The scope of the invention is best determined by reference to the appended claims.

In the video coding based on original quad-tree plus binary tree (QTBT) structure and the luma/chroma separate coding, the luma and chroma are coded separately for all Intra frames (for example, I-slice). However, in HEVC-SCC, the CPR is designed for three colour components jointly. The MV of CPR is used for all three components. According to one aspect of the present invention, the CPR design is modified when the luma and chroma are coded separately. In this disclosure, various methods of CPR coding with the luma/chroma separate CU structure are proposed as follows. In the following, various aspects of using the CPR mode for video data partitioned with QTBT structure or luma/chroma separate coding are disclosed.

Joint Colour Component Coding for CPR Mode

When the CPR mode is enabled for a current image, the luma and chroma (or R/G/B) separate coding is disabled. In other words, joint luma and chroma (or R/G/B) coding is used when the CPR mode is enabled. The use of the CPR mode may be indicated by high-level syntax, such as pps_currpic_ref_enabled_flag in PPS (picture parameter set) being true. In this case, the luma and chroma components will be coded jointly as the case for the P- or B-slice. In other words, the same coding unit (CU) structure is used to partition the luma and chroma components of the image area.

Also, the same motion vector (MV) or block vector (BV) for the luma and chroma components of the image area is used to locate the reference data.

In another embodiment, if the luma and chroma (or R/G/B) separate coding is applied, the CPR mode is disabled. In other words, the luma and chroma components are coded using a coding mode selected from a coding group excluding the CPR mode.

In other words, the use of CPR mode and the separate luma and chroma (or R/G/B) coding will not occur at the same time according to the above embodiments.

Separated CPR Coding for Luma and Chroma

When the luma and chroma are coded separately, separate CPR coding for luma and chroma components is used according to another embodiment. For example, for luma component coding, the MVs of luma blocks coded in the CPR mode only refer to the luma reconstructed picture. For chroma component coding, the MVs of chroma blocks coded in the CPR mode refer to the U/V (or Cb/Cr) reconstructed picture. For example, a luma image area (e.g. a luma slice or a coding tree unit, CTU) may be divided into luma blocks using a first CU structure and a chroma image area (e.g. a chroma slice or a coding tree unit, CTU) may be divided into chroma blocks using a second CU structure. If the luma blocks of the luma image area have first MVs and the chroma blocks of the chroma image area have second MVs, luma and chroma CUs/PUs can have different MVs. In other words, the first MVs and the second MVs can be different.

MV Prediction for Chroma CU Coded in the CPR Mode

When the luma and chroma components are coded separately and the separate CPR coding is used for the luma and chroma components, the MV from the luma MV or a scaled luma MV (if the luma component having different resolution from the chroma component) is used for MV coding of a chroma block (e.g., CU/PU) according to an embodiment of the present invention. For example, when the chroma CU/PU is coded using the CPR mode, if the collocated luma CU/PU is coded in the CPR mode, the luma MV or the scaled luma MV can be directly used for the chroma CU/PU or can be used as a MV predictor (MVP) for the chroma CU/PU. Furthermore, a luma merge flag can be signalled to indicate whether the luma MV or the scaled luma MV is directly used for the current chroma CU/PU. The luma merge flag can also be conditionally signalled. For example, it is signalled only when the collocated luma CU/PU is coded in the CPR mode. In another example, the luma merge flag is always signalled to indicate whether the current chroma CU/PU is coded in the CPR mode and the MV is copied from the scaled luma MV. In this example, if the collocated luma CU/PU is not coded in CPR mode, the default MV can be applied. The default MV can be (−w, 0), (0, −h), (−w, −h), (−2w, 0), (0, −2h), or any other pre-defined MV, where the w is the CU width or the PU width, and the h is the CU height or the PU height.

In another example, the luma merge flag is always signalled when the merge mode is applied for the chroma CU/PU. For example, the luma merge flag is always signalled when the merge_flag or the skip_flag is true for the chroma component. In this example, if the collocated luma CU/PU is not coded in CPR mode, the default MV can be applied. The default MV can be (−w, 0), (0, −h), (−w, −h), (−2w, 0), (0, −2h), or any other pre-defined MV, where the w is the CU width or the PU width, and the h is the CU height or the PU height.

In another embodiment, the luma MV or the scaled luma MV of the collocated luma block can be used as an MVP. It can be inserted into the merge candidate list or/and the AMVP candidate list. It can be inserted at the first candidate location (i.e., the leading location) in the list. The MV pruning can be applied for the following candidates. If the collocated luma CU/PU is not coded in the CPR mode, the candidate can be removed or the default MV is used as the candidate. The default MV can be (−w, 0), (0, −h), (−w, −h), (−2w, 0), (0, −2h), or any other pre-defined MV where the w is the CU width or the PU width, and the h is the CU height or the PU height.

In another embodiment, the luma MV or the scaled luma MV of the collocated luma block of the current chroma neighbouring block can be used as an MVP. It can be inserted into the Merge candidate list or/and the AMVP candidate list. If the collocated luma CU/PU is not coded in the CPR mode, the candidate can be removed or the default MV is used as the candidate.

In another embodiment, the luma MV or the scaled luma MV of the collocated luma block can be used as a temporal collocated MVP.

Collocated Colour Plane Candidate

Figure 10:
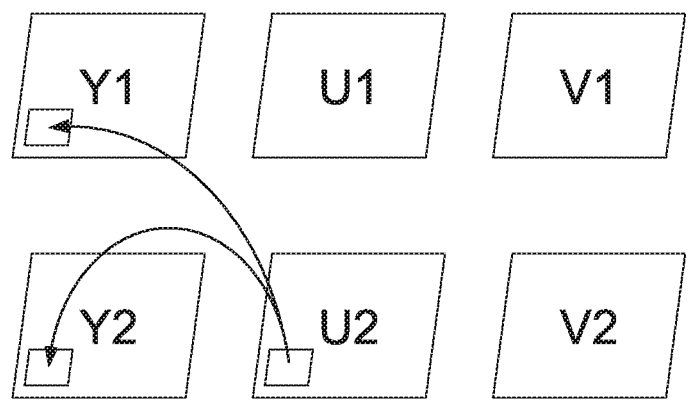
FIG. 10 illustrates an example of collocated colour plane candidate derivation from other colour planes in the same frame, where (Y1, U1, V1) and (Y2, U2, V2) are colour planes of two successive frames.

When a block in a colour plane is encoded, the decoder can derive its collocated colour plane candidates to predict the motion vector of the current block. The collocated colour plane candidates are derived from other colour planes in the same frame. FIG. 10 shows an example of collocated colour plane candidate derivation from other colour planes in the same frame, where (Y1, U1, V1) and (Y2, U2, V2) are colour planes of two successive frames. When coding a block in U2, a collocated colour plane candidate can be derived from Y2. Note that, the decoder can also derive collocated temporal candidates from the previous frames coded in HEVC. The new derived collocated colour plane candidates can be inserted into the candidate list along with other candidates in HEVC. The U/V (or Cb/Cr) colour plane in FIG. 10 can be combined. For example, it can be changed to four pictures corresponding to (Y1, U1+V1) and (Y2, U2+V2).

In another embodiment, when coding the chroma picture, the coded luma MV field can be used as the MV field of the temporal collocated picture. The original MV coding method in joint colour component coding can be applied for the chroma picture coding.

In another embodiment, when coding the chroma picture, the coded luma MV field is copied to the current reconstructed picture. When a CU/PU is decoded, the reconstructed samples and MVs are updated. The original MV coding method in joint colour component coding can be applied for the chroma picture coding.

LM Mode for CPR

Since the luma and chroma pictures are coded separately, the cross-colour prediction can be applied to generate the new prediction picture for coding. For example, when decoding a chroma picture, the decoded luma picture can be used to generate a new virtual chroma picture for prediction. The LM-like luma mode prediction generation as disclosed in the software based on HM (HEVC Test Model)/JEM (Joint Exploration Model) can be used, where the prediction sample=a*source_sample+b. Parameters a and b can be signalled in SPS/PPS/SliceHeader. The decoded luma MV field can be scaled as the MV field of the generated new virtual chroma picture. The bi-prediction can be applied. For example, one picture can be the current reconstructed chroma picture and the other picture can be the virtual chroma picture. When using the virtual chroma picture, the ladder shaped prediction area constraint in HEVC-SCC can be relieved.

CPR Reference Area Constraints for QTBT

When QTBT is used with CU equal to PU, there is only one prediction block per CU. The constraints specified in equations (1) to (3) are changed as follows:

$$BV\_x + \text{offset}X + nPbSw <= 0, \quad (1')$$

$$BV\_y + \text{offset}Y + nPbSh <= 0, \quad (2')$$

$$(xPbs+BV\_x+\text{offset}X+nPbSw-1)/\text{CtbSize}Y-xPbs/\text{CtbSize}Y <= yPbs/\text{CtbSize}Y-(yPbs+BV\_y+\text{offset}Y+nPbSh-1)/\text{CtbSize}Y. \quad (3')$$

The above modified equations also apply to the case of using coding unit (CU) structure to generate CUs where each CU corresponds to one PU. When three colour components of a picture are coded separately, where chroma U/V has an independent block vector, the variable offsetX and offsetY can be set as 0.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 11:
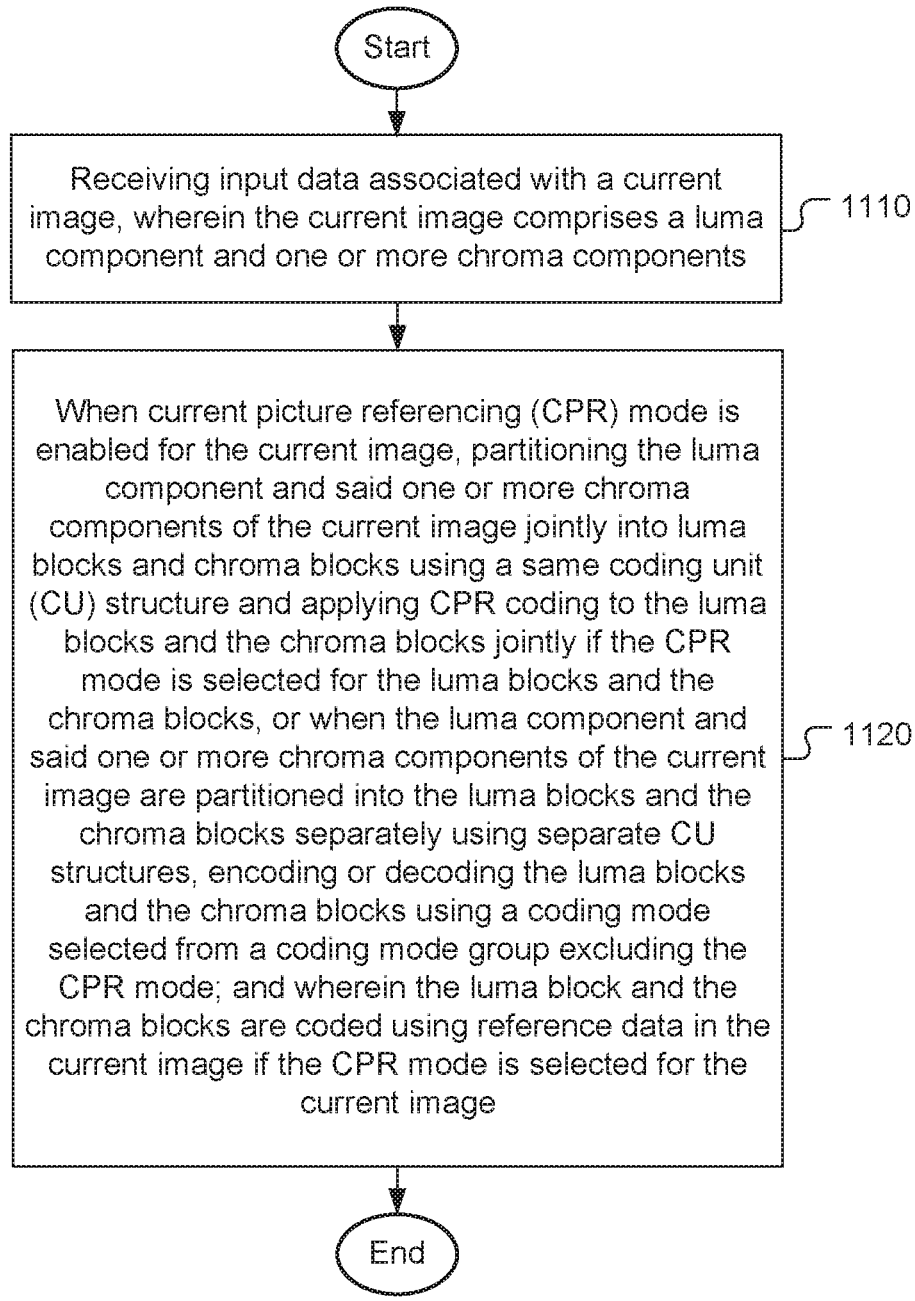
FIG. 11 illustrates a flowchart of an exemplary coding system with the current picture referencing (CPR) mode enabled according to an embodiment of the present invention, where the luma and chroma blocks of the current image are jointly coded using a same coding unit (CU) structure if the CPR mode is selected for the luma and the chroma blocks, or if the luma and chroma components are partitioned into the luma and the chroma blocks separately using separate CU structures, the luma and chroma blocks are encoded or decoded using a coding mode selected from a coding mode group excluding the CPR mode.

FIG. 11 illustrates a flowchart of an exemplary coding system with the current picture referencing (CPR) mode enabled according to an embodiment of the present invention, where the luma and chroma blocks of the current image are jointly coded using a same coding unit (CU) structure if the CPR mode is selected for the luma and the chroma blocks, or if the luma and chroma components are partitioned into the luma and the chroma blocks separately using separate CU structures, the luma and chroma blocks are encoded or decoded using a coding mode selected from a coding mode group excluding the CPR mode. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current image are received in step 1110, where the current image area comprises a luma component and one or more chroma components. At the encoder side, the input data may correspond to video data to be encoded. At the decoder side, the input data may correspond to compressed video data to be decoded. In step 1120, when current picture referencing (CPR) mode is enabled, the luma component and said one or more chroma components of the image area are partitioned jointly into luma blocks and chroma blocks using a same coding unit (CU) structure and the CPR coding is applied to the luma blocks and chroma blocks jointly if the CPR mode is selected for the luma blocks and chroma blocks, or when the luma component and said one or more chroma components of the image area are partitioned into the luma blocks and the chroma blocks separately using separate CU structures, the luma blocks and the chroma blocks are encoded or decoded using a coding mode selected from a coding mode group excluding the CPR mode. The luma blocks and the chroma blocks are coded using reference data in the current image if the CPR mode is selected for the luma blocks and the chroma blocks. When the coding unit (CU) structure is used to partition an image, the image is usually partitioned into slices, tiles, CTU rows or CTUs and the coding unit (CU) structure is applied to the CTU to generate CUs, PUs and TUs for coding process. The quad-tree plus binary tree (QTBT) structure can be used as the coding unit (CU) structure.

Figure 12:
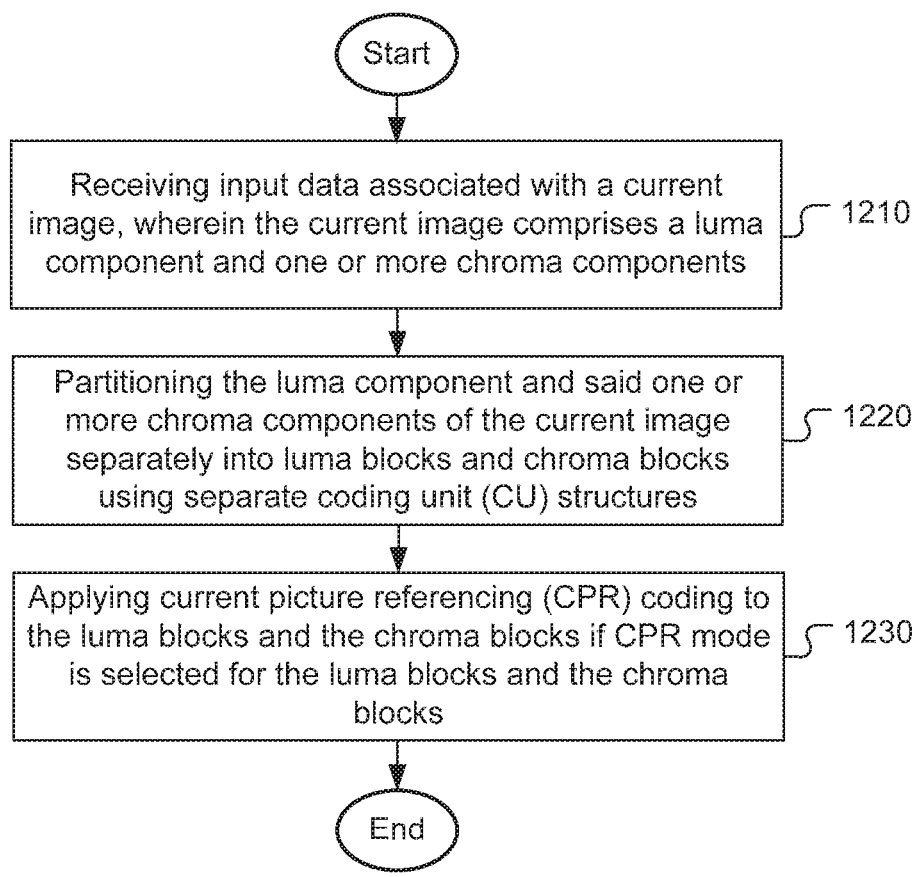
FIG. 12 illustrates a flowchart of an exemplary coding system with the current picture referencing (CPR) mode enabled according to an embodiment of the present invention, where the luma and chroma blocks of the current image are coded separately using a different CU structure if the CPR mode is selected for the luma and chroma blocks.

FIG. 12 illustrates a flowchart of an exemplary coding system with the current picture referencing (CPR) mode enabled according to an embodiment of the present invention, where the luma and chroma blocks of the current image are coded separately using a different CU structure if the CPR mode is selected for the luma and chroma blocks. According to this method, input data associated with a current image is received in step 1210, where the image area comprises a luma component and one or more chroma components. The luma component and said one or more chroma components of the image area are partitioned separately into luma blocks and chroma blocks using separate CU structures in step 1220. The current picture referencing (CPR) coding is applied to the luma blocks or the chroma blocks separately if CPR mode is selected for the luma blocks or the chroma blocks in step 1230. For example, the CPR coding may only refer to luma reconstructed reference data using motion vectors (MVs) of the luma blocks for encoding the luma component and the CPR coding may only refer to chroma reconstructed reference data using motion vectors (MVs) of the chroma blocks for encoding the chroma component.

Figure 13:
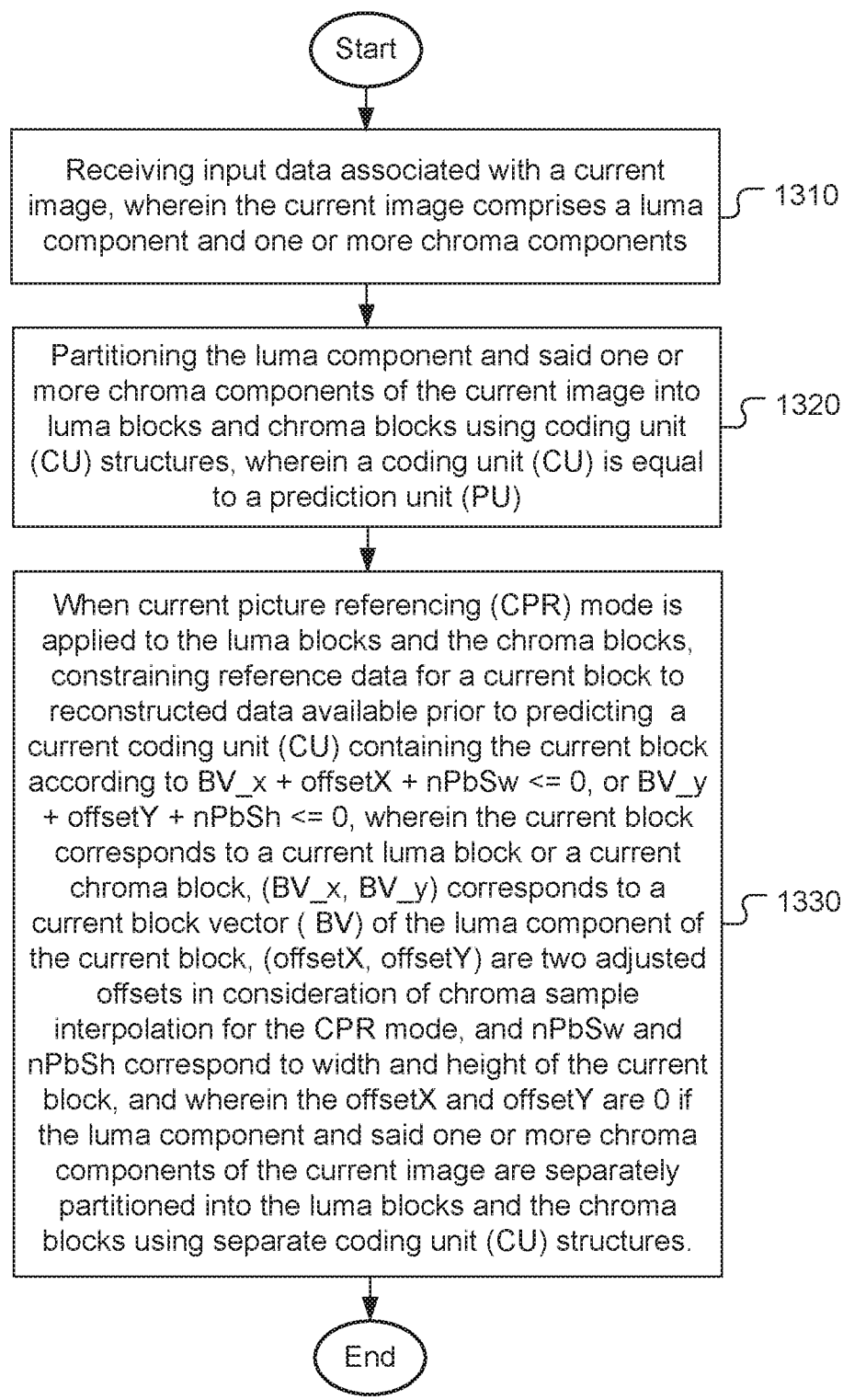
FIG. 13 illustrates a flowchart of an exemplary coding system with the current picture referencing (CPR) mode enabled according to an embodiment of the present invention, where reference data for a current block are constrained to reconstructed data available prior to predicting a current coding tree unit (CTU) containing the current block if the CPR mode is selected for the luma and chroma blocks.

FIG. 13 illustrates a flowchart of an exemplary coding system with the current picture referencing (CPR) mode enabled according to an embodiment of the present invention, where reference data for a current block are constrained to reconstructed data available prior to predicting a current coding tree unit (CTU) containing the current block if the CPR mode is selected for the luma and chroma blocks. According to this embodiment, input data associated with a current image is received in step 1310, where the current image comprises a luma component and one or more chroma components. The luma component and said one or more chroma components of the current image are partitioned into luma blocks and chroma blocks using coding unit (CU) structures in step 1320, where a coding unit (CU) is equal to a prediction unit (PU). In step 1330, when current picture referencing (CPR) mode is applied to the luma blocks and the chroma blocks, reference data for a current block are constrained to reconstructed data available prior to predicting a current coding unit (CU) containing the current block according to $BV\_x + \text{offset}X + nPbSw <= 0$, or $BV\_y + \text{offset}Y + nPbSh <= 0$. The current block corresponds to a current luma block or a current chroma block, (BV_x, BV_y) corresponds to a current block vector (BV) of the luma component of the current block, (offsetX, offsetY) are two adjusted offsets in consideration of chroma sample interpolation for the CPR mode, and nPbSw and nPbSh correspond to width and height of the current block, and where the offsetX and offsetY are 0 if the luma component and said one or more chroma components of the current image are separately partitioned into the luma blocks and the chroma blocks using separate coding unit (CU) structures.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding and decoding used by a video encoding system and video decoding system respectively, the method comprising:
receiving input data associated with a current image, the current image having a region that includes a combination of a luma component image and one or more chroma component images and the region being a slice or a coding tree unit (CTU) of the current image;
determining a luma coding unit (CU) structure for partitioning the luma component image of the region into luma blocks;
determining, separately from determination of the luma CU structure, one or more chroma CU structures for partitioning the one or more chroma component images of the region into chroma blocks;
applying current picture referencing (CPR) coding to the luma blocks in a case that a CPR mode is enabled for the luma blocks; and
applying, separately from application of the CPR to the luma blocks, the CPR coding to the chroma blocks in a case that the CPR mode is enabled for the chroma blocks,
wherein the CPR coding corresponds to predicting a current block based on a block of previously reconstructed samples in the current image indicated by a displacement vector.

2. The method of claim 1, wherein the applying the CPR coding to the luma blocks refers to luma reference data in a reconstructed luma image of the current image using first motion vectors (MVs).

3. The method of claim 2, wherein the applying the CPR coding to the chroma blocks refers to chroma reference data in a reconstructed chroma image of the current image using second MVs.

4. The method of claim 3, wherein the first MVs and the second MVs are different.

5. The method of claim 3, wherein a first MV or a scaled first MV for a collocated luma block is used to derive a second MV for a corresponding chroma block, and wherein the scaled first MV corresponds to a scaled MV of the collocated luma block if the luma component image and said one or more chroma component images have different resolutions.

6. The method of claim 5, wherein if the CPR mode is applied to the corresponding chroma block and the collocated luma block is coded in the CPR mode, the first MV or the scaled first MV for the collocated luma block is directly used as the second MV of the corresponding chroma block.

7. The method of claim 6, wherein a flag is used to indicate whether the first MV or the scaled first MV for the collocated luma block is directly used as the second MV of the corresponding chroma block.

8. The method of claim 7, wherein the flag is signalled or parsed when the corresponding chroma block is coded with merge mode or when the collocated luma block is coded in the CPR mode.

9. The method of claim 5, wherein if the CPR mode is applied to the corresponding chroma block and the collocated luma block is not coded in the CPR mode, a default MV is used as the second MV of the corresponding chroma block.

10. The method of claim 5, wherein if the CPR mode is applied to the corresponding chroma block and the collocated luma block is coded in the CPR mode, the first MV or the scaled first MV for the collocated luma block is used as an MV predictor (MVP) added to a Merge candidate list or an advanced motion vector prediction (AMVP) candidate list for the corresponding chroma block.

11. The method of claim 10, wherein the first MV or the scaled first MV for the collocated luma block is added to a leading candidate location in the Merge candidate list or the AMVP candidate list for the corresponding chroma block.

12. The method of claim 5, wherein if the CPR mode is applied to the corresponding chroma block and the collocated luma block is not coded in the CPR mode, a default MV is used as an MV predictor (MVP) added to a Merge candidate list or an advanced motion vector prediction (AMVP) candidate list for the corresponding chroma block.

13. The method of claim 12, wherein the default MV is selected from an MV group comprising (−w, 0), (0, −h), (−w, −h), (−2w, 0) and (0, −2h), wherein w is block width and h is block height.

14. The method of claim 5, wherein another first MV or a scaled MV of the another first MV for a collocated luma block associated with a neighbouring chroma block of the corresponding chroma block is used as the second MV of the corresponding chroma block.

15. An apparatus of video encoding and decoding used by a video encoding system and video decoding system respectively, the apparatus comprising one or more electronic circuits or processors configured to:
  receive input data associated with a current image, the current image having a region that includes a combination of a luma component image and one or more chroma component images, and the region being a slice or a coding tree unit (CTU) of the current image;
  determine a luma coding unit (CU) structure for partitioning the luma component image of the region into luma blocks;
  determine, separately from determination of the luma CU structure, one or more chroma CU structures for partitioning the one or more chroma component images of the region into chroma blocks;
  apply current picture referencing (CPR) coding to the luma blocks in a case that a CPR mode is enabled for the luma blocks; and
  apply, separately from application of the CPR to the luma blocks, the CPR coding to the chroma blocks in a case that the CPR mode is enabled for the chroma blocks,
  wherein the CPR coding corresponds to predicting a current block based on a block previously reconstructed samples in the current image indicated by a displacement vector.

16. The method of claim 1, wherein
  the luma CU structure has a partitioning structure selected from a quadtree (QT) structure, binary tree (BT) structure, QTBT structure, or tertiary structure, and
  the one or more chroma CU structures have a partitioning structure selected from the QT structure, BT structure, QTBT structure, or tertiary structure.

17. The apparatus of claim 15, wherein
  the luma CU structure has a partitioning structure selected from a quadtree (QT) structure, binary tree (BT) structure, QTBT structure, or tertiary structure, and
  the one or more chroma CU structures have a partitioning structure selected from the QT structure, BT structure, QTBT structure, or tertiary structure.

18. The apparatus of claim 15, wherein the one or more electronic circuits or processors are configured to apply the CPR coding to the luma blocks by refering to luma reference data in a reconstructed luma image of the current image using first motion vectors (MVs).

19. The apparatus of claim 18, wherein the one or more electronic circuits or processors are configured to apply the CPR coding to the chroma blocks by refering to chroma reference data in a reconstructed chroma image of the current image using second MVs.

20. The apparatus of claim 19, wherein the first MVs and the second MVs are different.

* * * * *